United States Patent [19]

Denis et al.

[11] 3,996,749

[45] Dec. 14, 1976

[54] METHOD AND PLANTS FOR PRODUCING, STORING, MODULATING AND DISTRIBUTING ENERGY

[75] Inventors: Louis Henri Daniel Denis, Puteaux-Bellini; Abel Jean Henri Bedué, Versailles, both of France

[73] Assignee: Compagnie Francaise d'Etudes et de Construction "Technip", Rueil-Malmaison, France

[22] Filed: May 5, 1975

[21] Appl. No.: 574,418

[30] Foreign Application Priority Data

May 7, 1974 France .............................. 74.15674
Oct. 8, 1974 France .............................. 74.33821
Mar. 28, 1975 France .............................. 75.09935

[52] U.S. Cl. .................................. 60/652; 60/659
[51] Int. Cl.² ..................... F01K 1/04; F01K 27/02
[58] Field of Search ............................ 60/652, 659

[56] References Cited

UNITED STATES PATENTS

| 1,129,735 | 2/1915 | Samuelson | 60/652 |
| 1,217,165 | 2/1917 | Fessenden | 60/641 |
| 2,942,411 | 6/1960 | Hutchings | 60/659 |
| 3,681,920 | 8/1972 | Margen | 60/652 |

Primary Examiner—Allen M. Ostrager
Attorney, Agent, or Firm—Flynn & Frishauf

[57] ABSTRACT

A method of producing, storing, modulating and distributing energy, consisting in: storing in tanks of large capacities hot water excesses produced at least during some working periods by thermal and nuclear electric power generating plants and using these hot water excesses according to the needs with the assistance of a hot water injection, recovery equipment, pipe-lines and facility means.

17 Claims, 4 Drawing Figures

METHOD AND PLANTS FOR PRODUCING, STORING, MODULATING AND DISTRIBUTING ENERGY

The invention relates to a method and plants for producing or generating, storing, modulating and distributing energy.

In the present state of the art there are known methods and plants which make use of thermodynamic equipments or systems such as steam boilers, steam turbines, gas turbines, waste heat recovery boilers, storage tanks for hot fluids, and so on . . . for producing energy usable in particular in mechanical, electrical, thermal and refrigerating or cryogenic form.

The needs of the users being very variable during a day a week, a year, give rise to the essential problem of making the power production tally with its consumption as well from the standpoint of the required quantity as the required utilization form. If it is therefore desirable to avoid the loss of large amounts of energy and the building of oversized power generating plants so as to meet or comply with all the peak requirements of the consumption, it is necessary to perform a modulation in the course of time of the various forms of consumable energy meeting an instantaneous demand. The ideal in this connection would be to be able to deliver from power plants in particular of the thermal or nuclear type operating at a substantially constant power (rated or design power of the power plants) any instantaneous power required under any form whatsoever by providing a reserve supply or store of energy of adequate quality and power so as to be able to meet the demand at any time. With such a background it would only be necessary to meet at any time the instantaneous disparate needs of the demand to operate at their rated or design power over the whole year power generating plants the required power which will therefore be reduced to the minimum needed. The present invention endeavours to substantially solve this problem.

There are also known various engineering arts for recovering energy. Some of them are based upon the use of the heat energy of deep hot water-bearing beds or underground sheets or layers of water. The hot water pumped from these beds or sheets may be used directly for instance for district heating or may be used for driving turbines or compressors according to the heat pump principle if there is simultaneously available a layer of cold water serving as a cold source. The geothermic energy is however limited in quantity by the small thermal gradient of the deep layers capable of giving off the heat to the water which is circulating therein and in quality by the temperature of the water or of its steam thereby preventing any production of electrical power under acceptable conditions of efficiency or yield.

Other engineering processes processes propose to store in natural or artificial tanks hot fluids such as for instance hot water which may be used later for instance for a district heating.

The method of producing, storing, modulating and distributing energy according to the invention is essentially characterized in that it comprises the steps of storing in tanks of large capacities the excesses of hot water produced at some working periods by the in particular electrical power generating thermal or nuclear plants and using these excesses of hot water according to the needs of the demand possibly with the assistance of hot water injecting and recovering systems.

According to another characterizing feature of the invention in the method consists in using heat pumps for revalorizing the thermal energy of the stored hot water and producing according to the instantaneous needs of the demand mechanical and/or electrical energy and/or cold and/or hot water or steam hotter than that stored.

According to a further advantageous characterizing feature of the invention ground-water tables or water bearing beds of greater or lesser depths are used as tanks or containers for storing the excess hot water.

It thus becomes possible to store in a particularly convenient, effective, economical and profitable manner and this over several months, the thermal energy in excess produced in particular by the thermal and nuclear power plants during the warm season (in particular between the beginning of April and the end of August) and to use this heat in excess more particularly during the cold season (in particular between October and the end of January), and to modulate according to the needs the distribution of electrical, mechanical, thermal, refrigerating or cryogenic, etc..., energy to the users. At the same times are solved the problems of thermal pollution feared by the ecologists.

It should at last be noted that when a water-bearing stratum or like underground sheet of water is used possibly completed or replaced by tanks and connecting pipe-lines there are simultaneously provided the distribution and storage in the vicinity of the power distribution area.

The invention relates moreover to systems and facilities for the production, the storage, the modulation and the distribution of energy, characterized in that they comprise at least one power generating thermal plant, a hot water distribution system, water pumping stations, apparatus, devices, appliances or contrivances using hot water as well advantageously as heat pumps, refrigerating machinery and/or motors and engines using closed vapour or steam and/or gas cycles and in that these different elements of the systems or facility are operatively connected to each other as described hereinabove.

The invention will be better understood and further objects, characterizing features, details and advantages thereof will appear more clearly as the following explanatory description proceeds with reference to the accompanying drawings given by way of non-limitative examples only, illustrating some presently preferred specific forms of embodiment of the invention and wherein.

Figure 1:
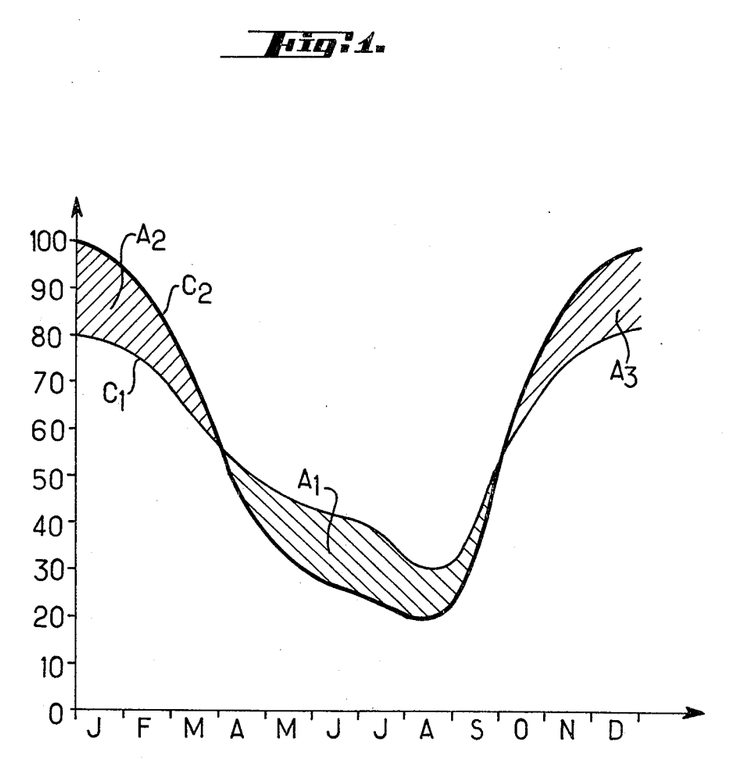
FIG. 1 is a graphical diagram of chart illustrating the seasonal relationship between the heat production rejected, wasted or discharged by the thermal and nuclear power plants in France and the seasonal thermal needs in particular for district heating.

Reference should at first be made to FIG. 1 which illustrates in part the economical interest of the invention. In this figure the curve $C_1$ weighted over several years shows the amount of heat rejected or discharged in France by the thermal and nuclear power plants into the rivers or the atmosphere (taking into account the overall efficiency of the production of electricity which is in the range of from 30 % to 35 %), this amount of heat being plotted in ordinates against the time period expressed in months and plotted in abscissae.

In the same manner curve $C_2$ in this Figure shows the seasonal thermal needs more particularly for district heating.

From the comparison of both curves it is seen that the production of wasted or lost heat by the power plants is greater than the demand during the warm season (in particular from April to August), and that it is smaller than the demand during the cold season (in particular from November to February).

According to the invention it is advocated on the one hand to already use the amount of heat produced by the power generating plants and not converted into electrical energy for heating dwelling rooms and premises and for various other industrial applications needing badly hot water: chemical industry, paper manufacturing mills and factories, textile industry, and so on.

It is found furthermore that during the warm period the power plants deliver an excess of energy which may not be used at that time in this form, whereas during the cold period they do not supply enough power.

When comparing both curves $C_1$, $C_2$ it is found that the hatched or shadowed area $A_1$ between the curves $C_1$ and $C_2$ which corresponds to the amount of energy in excess delivered by the power plants during the warm period has a surface area substantially equivalent to the added hatched surfaces denoted by $A_2$, $A_3$, which show the extra needs of energy in the form of heat during the cold period which may not be met by the power plants. It is finally found that the area of the surface $A_1 = A_2 + A_3$ is equal to about 10% of the surface defined between the curve $C_1$ and the axis of the abscissae, i.e. it corresponds to 10 % of the total energy released by the power plants in the form of heat.

According to the invention by storing that part of excess power released by the power plants during the warm period it is thus possible to directly meet at any time of the year the needs for hot water of the utilization appliances.

However in addition thereto, and as it will become apparent more clearly by means of the description which follows, it becomes possible owing to the storage and distribution of these stored hot waters to also modulate in quality at any time by in particular differentiating the diurnal and nocturnal periods, i.e. day times and night times as well as the working days and the public holidays, the very variable instantaneous needs in particular of electrical and mechanical energy.

Figure 2:
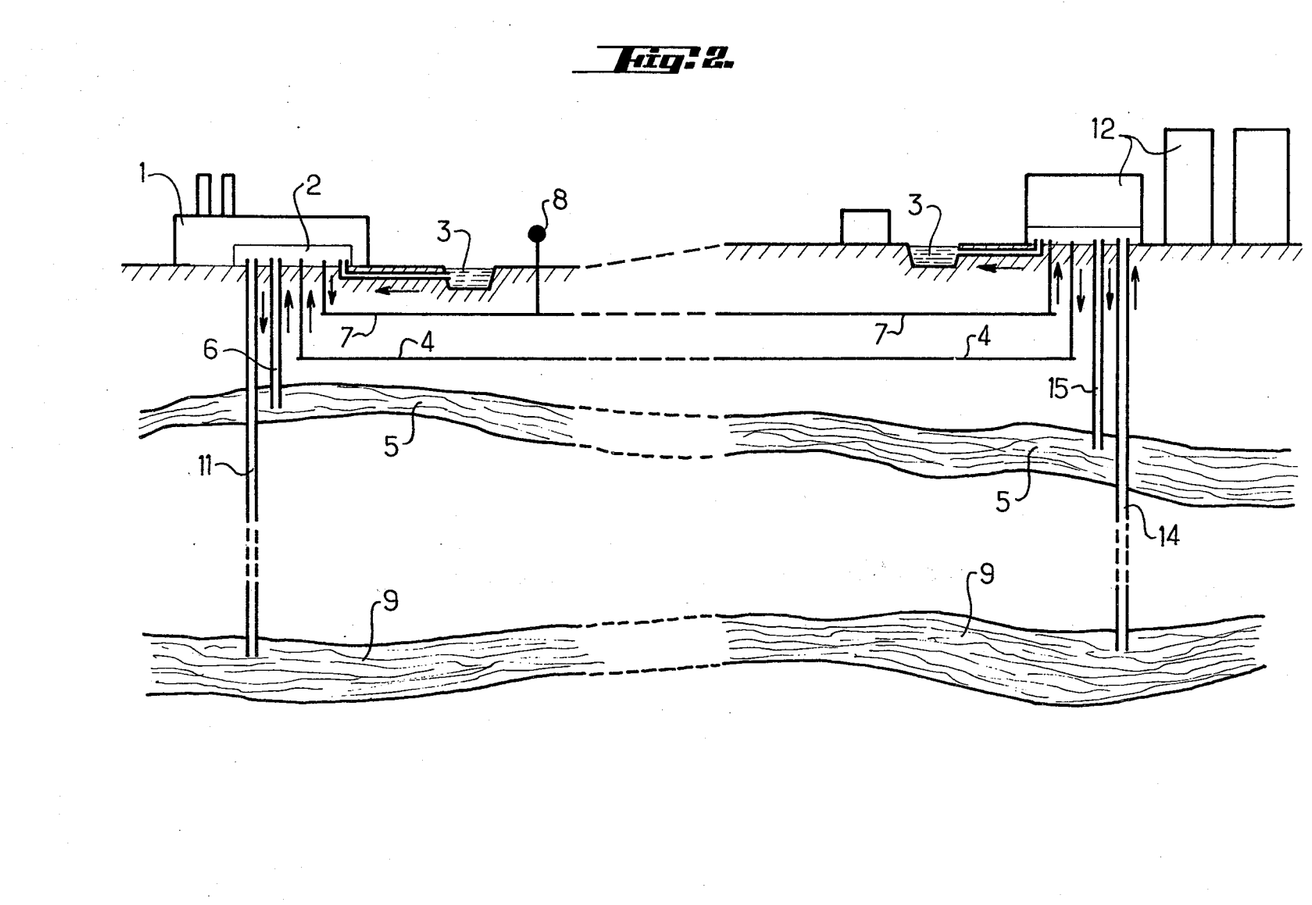
FIG. 2 is a view in vertical section diagrammatically showing the lay-out of a system using the process according to the invention.

Reference should now be made to FIG. 2 wherein the system diagrammatically shown according to the invention comprises at least one thermal power plant 1 working with or using fossil or nuclear fuel and the condensing station 2 of which is supplied with cooling water by a river 3 and/or by a cold water pipe-line system 4 and/or from cold ground-water, water-bearing beds or like underground sheets or layers of water 5 through wells 6. The hot water rejected by the condenser 2 at a temperature of about 80° to 120°C is drained off or discharged by a hot water pipe-line system 7 possibly including hot water storage tanks 8 and/or towards more or less deep sheets of ground-water 9 through wells 11. The hot water used by an urban area 12 (industrial, collective, individual needs and requirements) is distributed by said hot water pipe-line system 7 and/or said ground-waters 9 through Artesian wells 14. The waters used at 12 hence cooled are discharged towards the tiver 3 and/or by said cold water pipe-line system 4 and/or towards said cold ground-waters 5 through wells 15. These various transfer and collecting means are used according to the modulated hydrological, climatic, geothermic, etc. . . . conditions in view of their computing characteristics and their working conditions.

Figure 4:
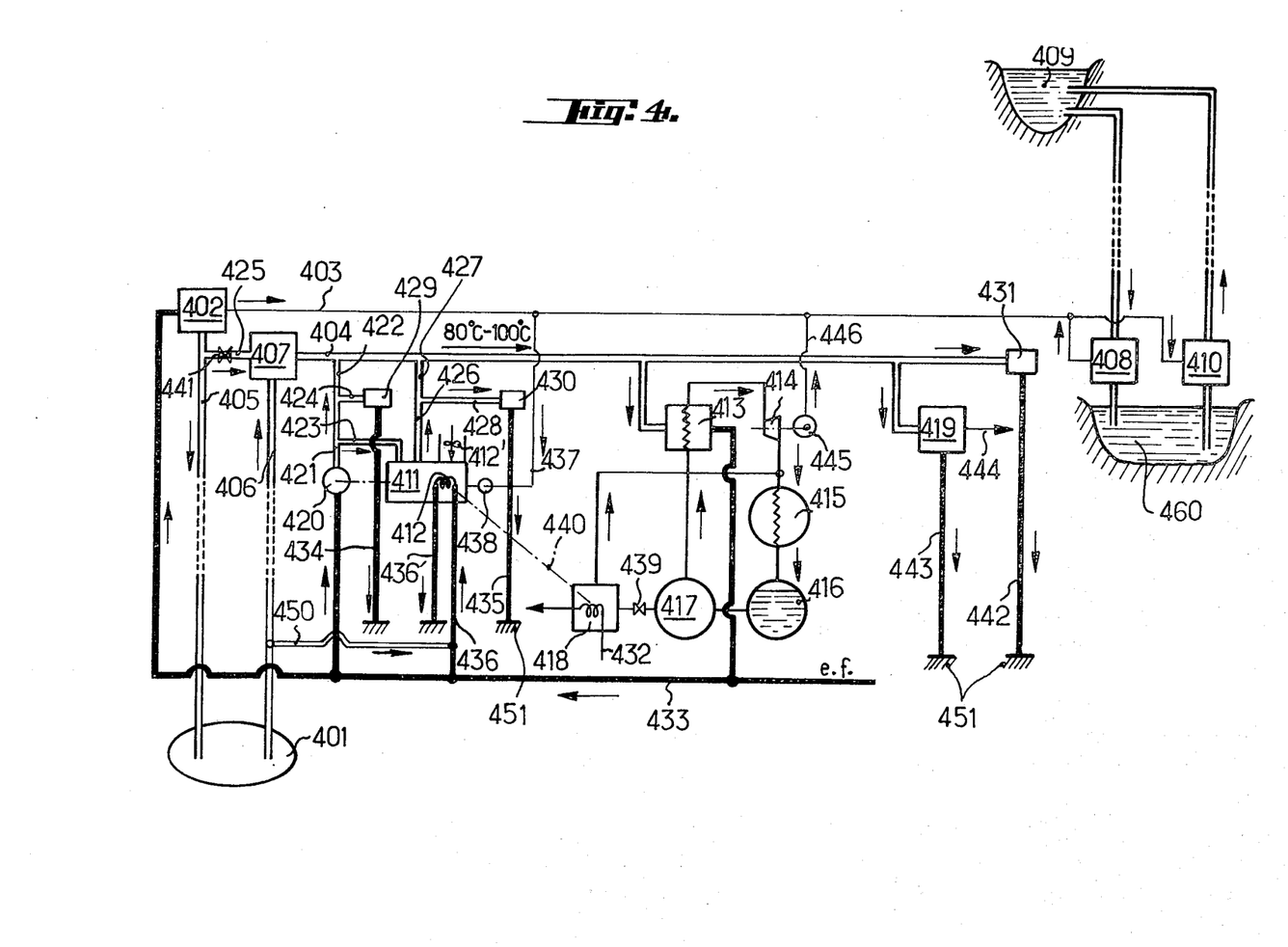
FIG. 4 is a diagrammatic showing of another plant designed according to the invention and using complex imbrication of various apparatus.

As will be explained in detail hereinafter with reference to FIG. 4, heat pumps should be advantageously used for revalorizing the available thermal energies by supplying according to the instantaneous needs mechanical and/or electrical energy and/or water or stream at higher temperature and/or cold.

The invention provides an integrated assembly of electrical and heat power generating systems and of thermal energy distributing and storing systems making it possible to use the energy of the fuels under the best conditions of mean overall efficiency. The final object to be attained is to manage to achieve a maximum reduction in the fuel consumption of the country not only with respect to the systems with separate production but also with respect to the more or less complex known systems.

By way of merely illustrative example, the energy balance sheets of two power plants operating with fossil fuel one of them being a conventional electrical power plant whereas the other one is a plant according to the invention will be compared hereinafter.

In a conventional power plant of advanced technology the following reckoning is usually made:
efficiency of electrical power supplied: 38%
stack or flue loss: 10%
water loss in the condenser: 52%
sum total: 100%

With an equipment according to the invention there will be obtained in the same fashion:
efficiency of electrical energy produced and commercialized: 31%
efficiency of thermal energy of commercialized water at 100°C: 59%
stack or flue loss: 10%.

Thus according to the invention 90 % of the energy of the fuel burnt in the power plant is actually used and commercialized against 38 % only in the case of a conventional power plant.

In the case of a nuclear power plant the results are still more favourable since the electrical power production efficiencies or yields are definitely smaller in a nuclear power plant than in a power plant using fossil fuel.

It should further be noted that the distribution of thermal energy from the power plants through hot water is easy. In the case of surface pipe-lines, pipe diameters of 1.20 m are adequate for a power plant of 500 MW and the heat losses do not exceed 0.5 for 25 km of pipe-lines.

In the case of the conveyance and storage using more or less deep sheets or layers of ground-water and even geothermic water-bearing beds according to the locations the invention uses a very economical means, since it is not necessary to provide a surface pipe-line system but only wells for the injection of hot waters and wells for the recovery of hot water, the conveyance being effected by the more or less deep sheets or layers of ground-water.

Figure 3:
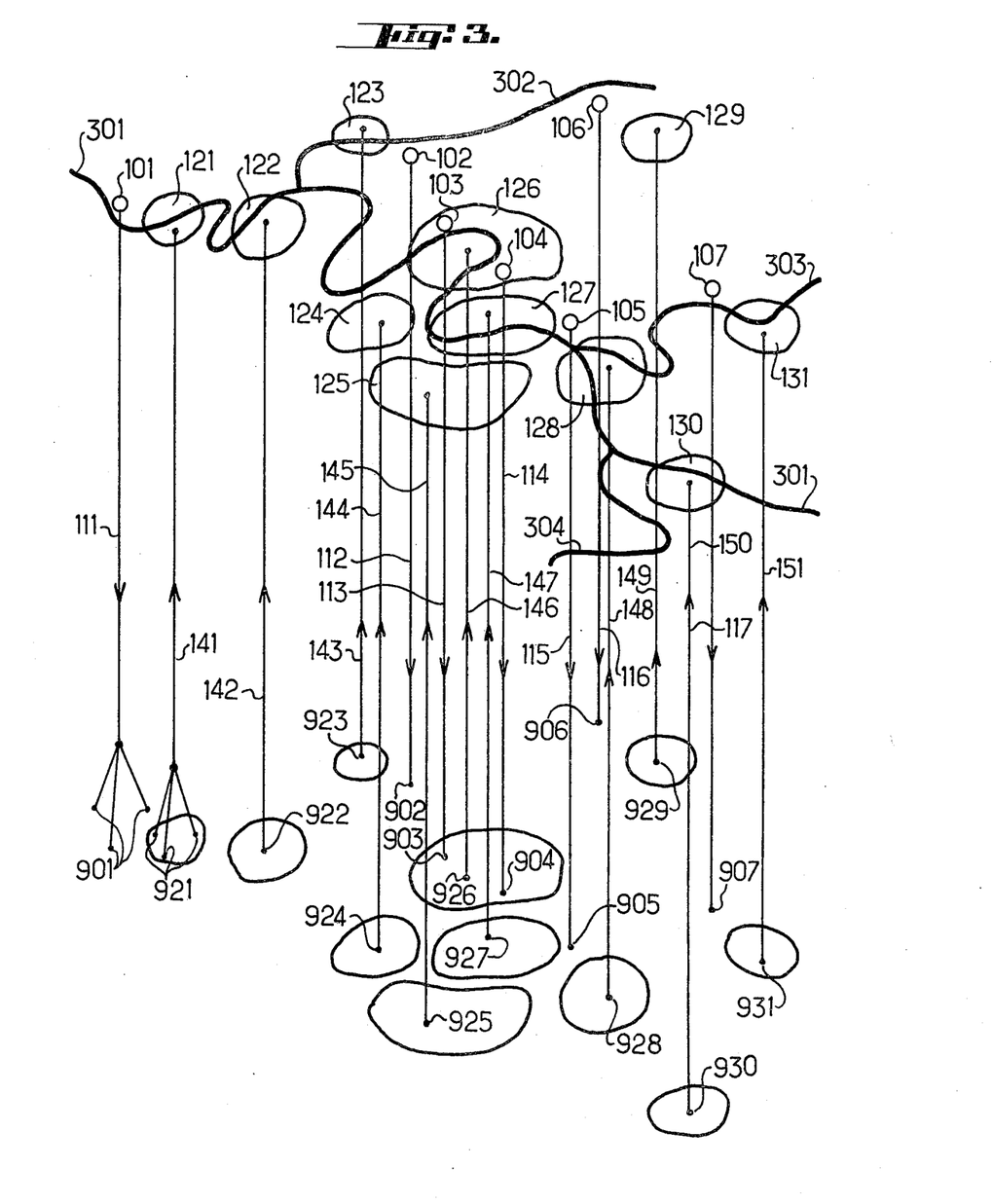
FIG. 3 is a perspective diagrammatic view of a district or urban area using sheets or layers of water as the equipment shown in FIG. 1.

Reference should now be made to FIG. 3 in which is illustrated a practical example given by way of non-limitative illustration of one application of the invention restricted to a few power plants and to a few utilization areas.

FIG. 3 shows at its upper portion the perspective view of an urban area or district, namely the Paris basin and its lower part corresponds to the deep geothermic sheet or layer of ground-water which in the Parisian region is located at a depth of about 2,000 meters. This urban district or area comprises about a river 301 and its tributaries or affluents 302 to 304 thermal power plants 101 to 107 and urban areas 121 to 131. Each thermal power plant 101 to 107 discharges its hot water through a well 111 to 117 may be vertical (as shown for the well 112 of the power plant 102) or slanting or multiple (as shown for the well 111 of the power plant 101) and leads to the deep sheet or layer of ground-water 901 to 907. Each urban area 121 to 131 receives its hot water from a well whether Artesian or not 141 to 151 which may be vertical (well 142) or slanting or multiple (well 141) leading from the deep sheet or layer of ground-water 921 to 931.

This surface-deep ground-water-surface exchange and transfer device may of course be completed with surface pipe-line systems (not shown). The rivers 301 to 304 may serve the purpose of draining off the hot water cooled in the utilization zones 121 to 131. The waters of the rivers may provide extra amounts or make-up amounts to the power plants 101 to 107 after possibly having been properly treated or processed.

A more complex examplary embodiment diagrammatically illustrated in FIG. 4 will now be described.

According to the lay-out diagram shown more or less deep ground-waters 401 located for instance at a depth of 100 to 500 meters or also of 1,500 to 2,500 meters are used to store hot waters produced in excess during some working periods of a thermal power plant 402 which feeds on the one hand an electric network 403 and on the other hand a hot water pipe-line system 404. The thermal power plant 402 is fitted with a feed and return main or duct for return to the ground-waters 401 or preferably as shown with a feed duct or main 405 and with a return duct or main 406. The thermal power plant 402 may be fitted with an arrangement 407 for injecting and recovering hot waters connected to the ducts 405 and 406 and to the hot water pipe-line system 404.

It should be noted that this hot water pumping only consumes little energy with respect to the energy stored in the hot water. For instance for a flow rate of 200 m³ per hour of water at 100° C the heat energy stored with respect to an ambient or room temperature of 20° C amounts to 16 millions kcal/h. The computations show that the stored energy less the energy required for pumping is recovered with an efficiency varying from 90 % to 99 % according as to whether the conditions are favourable or not.

An improvement advantageously used within the scope of the invention consists in driving or operating a hydraulic power plant 408 by the storage pool water 409 of a dam during periods of peak demands for electricity and pumping again in a pumping station 410 the waters of the lower lake 460 into the storage pool 409 of the dam upon an overproduction of electricity in the electric network 403.

An essential improvement of the invention consists in using a heat pump 411 which is normally driven by a heat engine 420 which may be of any suitable type such as an internal combustion engine, a gas turbine, etc. In the case where a heat pump is used at a high temperature for instance at 160° C and more, the compressor of the heat pump should be built so that the suction sides be arranged at the ends of the compressor, its delivery or discharge side being located substantially in its centre plane.

The heat pump may be used in various ways.

When it is driven by a heat engine 420, the latter is cooled by a circulation of cold water flowing from a pipe-line system 433 which may also feed the power plant 402 and receive the various returns of cold water. The thermal effluents rejected by the engine 420 in the form of hot water or steam 421 may be carried back through the duct 422 to the pipe-line system 404, or also through a pipe-line system 424 to utilization places 429 operating in particular at high temperature, or also through a pipe 423 towards the heat pump 411. In the latter case the heat pump 411 may be used to raise the thermal level of the hot waters or of the steam produced which may be rejected through 426 either for being injected at 427 into the pipe-line system 4 or towards the duct 426 and utilization stations 430 such as for instance chemical industries, textile industries, etc. At 434, 435 have been shown the cold water returns after use of the hot waters at 429, 430.

The heat pump 411 takes its thermal energy (cold source) either from a water heat exchanger 412 fed for instance by the duct 436 branched off or leading from the cold water pipe-line system 433 or from the outside air fed by a blower fan 412'. A communication or connecting line 450 may be provided between the feed pipe 406 and the duct 436 thereby making it possible to achieve an increase in the output temperature at the outlet 426 of the heat pump 411 owing to the increase in the temperature of its "cold" source fed by the pipe-line system 406 for hot water stored in the ground-water bearing bed 401.

In case of overproduction of electricity in the electric network 403, the heat pump 411 may possibly be driven as diagrammatically shown at 437 by an electric motor 438 energized by or taking its power from the network 403.

The heat pump 411 may also be used to produce cold and in such a case, instead of taking its heat from the exchangers 412, 412', it may take it from a refrigerating or cold circuit such as diagrammatically shown at 432 which may make up for the lack of production of cold generated by the expansion of the refrigerating or cryogenic fluid such as Freon 416 with the expansion valve 439 in the refrigerating exchanger 418, as will be described hereinafter. In order to avoid overloading the drawing, the connection between the circuit 433 and the heat pump 411 has been shown diagrammatically only the dash-dotted line 440.

The heat pump 411 may according to considerations of selection and opportunity or expediency be located:

in the thermal power plant 402 by arranging the Freon compressor on the shaft of the turbo-alternator set of the power plant and in such a case the steam and gas turbine supplies energy to the alternator (which generates electricity in the network 403) and to the heat pump;

in the thermal power plant 402 but with separate machinery and equipment advantageously driven by the heat engine 420;

in an intermediate position on the pipe-line system:
at the user's itself.

In any case the use of the heat pump increases the overall efficiency or yield of the equipment and facilitates or promotes the modulation of the energy in the form of electricity or hot water.

Moreover the heat pump may have:

as a cold source the hot water at 80°C and then deliver hot water at 120° C to 140° C for applications such as paper manufacturing mills and factories, textile industry, chemistry, etc;

as a cold source the residual heating waters at about 25° C and provide hot water to the pipe-line system at about 80° C;

as a cold source cold water or cold air.

Another improvement likely to be used within the scope of the invention consists in converting the low level thermal energy stored within the tanks, groundwaters and/or hot water pipe-line systems into mechanical energy for instance by using a vapour or steam cycle such as the Carnot cycle or a closed hot gas cycle such as the Stirling cycle. For instance, hot water from the pipe-line system 404 at about 80° to 100° C may be used in a boiler 413 for boiling therein a suitable fluid under pressure such as propane or Freon. Its vapour under pressure may operate an engine 414 such as for instance a turbine which drives auxiliary machines and/or an electric generator 445 providing through the connection 446 electricity to the network 403. The efficiency achieved is of about 5% to 10% which is high enough since this is a local recovery. The cycle comprises a condensation of the fluid within a condenser 415, hence a plentiful production of refrigerating liquid in a tank or vessel 416 from which the liquid is conveyed through a pump 417 towards the boiler 413 or towards a refrigeration appliance 418 while flowing back to the inlet of the condenser 415 after having been expanded in a valve 439. Thus, this simple equipment comprising conventional machinery is capable of simultaneously supplying heat at about 80° C, cold (in the circuit 432) at temperatures ranging from − 40° to + 10°C and mechanical and/or electrical energy.

By way of illustrative example, a pipe-line conveying hot water at 100° C, with a diameter of 100 mm, delivering a flow rate of 60 m$^3$ per hour, i.e. about 5,000,000 calories per hour, is capable of feeding a combined power equipment having the following approximate maximum capacities: 300 KW of electric power, 5,000 thermal units of heat at 80° C and 3,000 thermal units of heat at 50° C (sanitary equipment), and 2,000,000 frigories of cold at +10° C. These various maximum productions cannot of course be obtained simultaneously but the modulation is in any case imposed by the season and/or by the instantaneous needs or wants. It should be noted that this multiple-power equipment depends only upon the hot water vector at 80° to 100° C (1 thermal unit = 1,000 great calories).

According to another improvement which may be used within the scope of the invention, there is used the heat of the hot water pipe-line system 404 in a refrigerating equipment 419 producing cold through a known process such as an absorption refrigeration machine working with ammonia, lithium bromide, etc., the object or purpose aimed at being to facilitate or to promote the modulation of the utilizations of energy in the form of electricity or heat (hot water). In winter, hot water is essentially used for heating purposes but in summer it is essentially used for refrigeration purposes for producing cold as diagrammatically shown by the arrow 444 for refrigerating rooms, dwellings and like premises. It should pointed out, on a consequently there or achieved, a stabilization during the year of hot water consumption which is thus more evolving or increasing like electricity consumption.

In the drawing the various arrows show either the direction of flow of the fluids or with reference to the electric network the direction in which energy is supplied.

The cold water returns such as 434, 435, 436', 442, 443 may either be cycled back to the pipe-line system 433 or rejected or discharged as wastes wholly or in part as diagrammatically shown at 451.

In the figure should be noted the connection 425 advantageously provided between the pipe or duct 405 for rejecting or discharging hot waters by the power plant 402 and the pumping station 407. A valve 441 provided on the connection line 425 makes it possible to adjust to the desired level the flow rates of fluids rejected or discharged by the power plant 402 towards the storage area 401 and towards the station 407. With 431 has been denoted utilization facilities located at the end of the pipe-line system 404 together with their cold water return circuits 442.

Among the advantages obtained according to the invention may be stated in particular the following:

The modulation is promoted or facilitated in the working of the plants or equipment producing electrical energy and hot water;

there are simultaneously provided differentiated energy forms useful for particular needs, wants or requirements in particular forms such as motive or mechanical power, electricity, hot waters at different temperature levels such as 50° C, 80° C, 120° C, cold water at +10° C, refrigerant medium or refrigeration fluid at a temperature lower than 0° C, etc.;

the overall energy efficiency or yield is increased through improvements of the cycles at the level of production and utilization of energy in its various forms and this on a local and/or regional and/or national or countrywide basis, the overall efficiency of thermal power plants of conventional type being of about 33%, whereas the overall efficiency of an equipment or system comprising the improvements according to the invention inclusive of the heat pump may largely attain 165%;

The safeness or security and the continuity of the various services and utilities are increased through the intercorrelation of the systems;

there is obtained an economical transport or conveyance, through hot water, of huge amounts of energy.

It should be understood that the invention is not at all limited to the forms of embodiment which have been given by way of examples only, the invention comprising all the technical equivalents of the means described as well as their combinations if same are carried out according to its gist and used within the scope of the appended claims.

What is claimed is:

1. A method of producing, storing, modulating and distributing energy, comprising:

storing in storage areas of large capacities hot water excesses produced at least during some working periods by thermal-type electric power generating plants;

driving at least one heat pump by means of a heat engine;

increasing the thermal energy of said stored hot water excesses by means of the heat output of the heat pump;

selectively injecting said hot water excesses through pipe-lines feeding at least one a hot water injection, recovery equipment and facility means; and reheating at least a part of the hot water excesses injected into said pipe-lines by the thermal effluents of the heat engine driving the heat pump.

2. A method of claim 1 comprising storing said hot water excesses in underground water-bearing beds and distributing said hot water excesses therefrom.

3. A method of claim 2 comprising the step of using as said underground water storage areas deep geothermically hot ground-waters.

4. A method of claim 1, wherein said heat pump is fed from said stored hot water excesses acting as its "cold source", producing water or steam at a temperature higher than that of its "hot source", and injecting said water or steam produced by said heat pump into said pipe-lines to reheat said hot water excess injected into said pipe-lines.

5. A method of claim 4 comprising storing hot water at about 80° C and delivering same to said heat pump to serve as its cold source, said heat pump delivering hot output water at about 120° to about 140° C.

6. A method of claim 1 comprising delivering water or air at about ambient temperature to said heat pump to serve as its cold source, said heat pump feeding a pipe-line system for hot water at about 80° C.

7. A method of claim 1 comprising converting low level heat energy into mechanical energy by vapour-type processes or the Carnot cycle-type.

8. A method of claim 1 comprising converting low level heat energy into mechanical energy by closed cycle-type processes working with hot gases of the Stirling cycle-type.

9. A method of claim 1 comprising the step of modulating the production of electricity and hot water in an hydraulic power plant, wherein said storage areas comprise storage pools of the dams of the hydraulic thermal electric power plants, by using the reserve supply of energy stored in and recovered at will from the storage pools of the dams in order to increase the electricity production when same exhibits a shortage with respect to the heat production, and reversely in the contrary case to store electric energy by retaining water within said dam storage pools and by feeding water from said storage pools through pumping equipment of said power plant.

10. Plant for the production, storage, modulation and distribution of energy, comprising:

at least one power generating thermal plant supplying an electric network;

at least one storage area of large capacity coupled to said thermal electric plant for storing hot water excesses produced by said thermal electric plant;

a hot water distribution pipe-line system coupled to said at least one storage area;

a plurality of water pumping stations coupled to said pipe-line system;

a heat pump driven by a heat engine; and utilization apparatus for selectively using hot water at different locations and times, said utilization apparatus being operatively connected to said heat pump, said storage areas and to said pipe-line system, and including means for (i) storing hot water in said storage areas during periods for which production of hot water by the thermal electric plant exceeds the needs of the demand, (ii) injecting hot water into the pipe-line system to reheat the hot water by the thermal effluents of the heat pump, according to the instantaneous needs of the demand, (iii) recovering hot water stored in said storage tanks during periods for which demand for hot water exceeds the production from the thermal electric plant, and (iv) selectively using hot water at different locations and times for operating said heat pumps and output utilization means.

11. Plant according to claim 10 wherein said heat pump delivers an output fluid at a high temperature up to about 160° C. and comprises a compressor having suction sides arranged at the ends thereof and a discharge side arranged in a substantially central plane thereof.

12. Plant according to claim 10 wherein said thermal electric plant comprises a turbine, and wherein said heat pump comprises a compressor coupled to the turbine of said thermal electric plant.

13. Plant according to claim 10 wherein said heat pump comprises a compressor coupled in an intermediate position in the pipe-line system.

14. Plant according to claim 10 wherein said thermal electric plant comprises a boiler coupled to said at least one hot water storage area, said boiler comprising means utilizing hot water at from about 80° to about 100° C. for boiling a fluid refrigerant under pressure; an engine driven by the vapourized fluid under pressure and driving an output device; a condenser at the output of said engine; a refrigerant liquid tank at the outlet of said condenser; and a pump coupled to said tank for pumping the liquid therefrom.

15. Plant according to claim 14 wherein said pump is coupled to return said liquid from said tank to said boiler.

16. Plant according to claim 14 wherein said pump is coupled to return said liquid from said tank to a refrigeration circuit connected back to said condenser.

17. Plant according to claim 14 wherein said output device is an electric power generator.

* * * * *

UNITED STATES PATENT AND TRADEMARK OFFICE
CERTIFICATE OF CORRECTION

PATENT NO. : 3,996,749
DATED : December 14, 1976
INVENTOR(S) : LOUIS HENRI DANIEL DENIS et al It is certified that error appears in the above-identified patent and that said Letters Patent are hereby corrected as shown below:

Column 2, line 2: delete "in" (first occurrence).

Column 2, line 51: before "chart", replace "of" with --- or ---.

Column 4, line 58: replace "0.5 for" with --- 0.5°C. for ---.

Column 5, line 34: after "shown", insert a comma (,).
Column 8, line 1, after "it should" insert -- be --.
Column 8, lines 1-2: delete "on a consequently there or achieved" and replace with --- as a consequence, there is achieved ---.

Column 9, line 2: after "at least one", insert --- of ---.
Column 9, line 30, before "the Carnot type", replace "or" with -- of --.

Signed and Sealed this

Sixth Day of December 1977

[SEAL]

Attest:

RUTH C. MASON
Attesting Officer

LUTRELLE F. PARKER
Acting Commissioner of Patents and Trademarks